United States Patent
Gemin et al.

(10) Patent No.: US 11,802,492 B2
(45) Date of Patent: *Oct. 31, 2023

(54) TORSIONAL DAMPING FOR GAS TURBINE ENGINES

(71) Applicant: General Electric Company, Schenectady, NY (US)

(72) Inventors: Paul Robert Gemin, Cincinnati, OH (US); Thomas Lee Becker, Symmes Township, OH (US); Tod Robert Steen, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/749,805

(22) Filed: May 20, 2022

(65) Prior Publication Data

US 2022/0282637 A1 Sep. 8, 2022

Related U.S. Application Data

(60) Continuation of application No. 15/491,638, filed on Apr. 19, 2017, now Pat. No. 11,346,243, which is a
(Continued)

(51) Int. Cl.
*F01D 25/04* (2006.01)
*F01D 15/10* (2006.01)
(Continued)

(52) U.S. Cl.
CPC ............. *F01D 25/04* (2013.01); *F01D 15/10* (2013.01); *F02C 3/04* (2013.01); *F02C 6/14* (2013.01);
(Continued)

(58) Field of Classification Search
CPC .. F02C 3/107; F02C 3/113; F02C 7/36; F02C 3/04; F02C 6/14; F02C 7/22; F01D 15/10;
(Continued)

(56) References Cited

U.S. PATENT DOCUMENTS

| 5,160,080 | A  | 11/1992 | Hines et al. |
| 7,423,411 | B2 | 9/2008  | Sihler |
| 7,923,874 | B2 | 4/2011  | Himmelmann |
| 8,203,316 | B2 | 6/2012  | Lemmers, Jr. |

(Continued)

FOREIGN PATENT DOCUMENTS

| EP | 2218939 A1 | 8/2010 |
| EP | 2264867 A1 | 12/2010 |

(Continued)

*Primary Examiner* — Todd E Manahan
*Assistant Examiner* — Rene D Ford
(74) *Attorney, Agent, or Firm* — Dority & Manning, P.A.

(57) ABSTRACT

The present disclosure is directed to a gas turbine engine assembly having a compressor configured to increase pressure of incoming air, a combustion chamber, at least one turbine coupled to a generator, a torsional damper, and a controller. The combustion chamber is configured to receive a pressurized air stream from the compressor. Further, fuel is injected into the pressurized air in the combustion chamber and ignited so as to raise a temperature and energy level of the pressurized air. The turbine is operatively coupled to the combustion chamber so as to receive combustion products that flow from the combustion chamber. The generator is coupled to the turbine via a shaft. Thus, the torsional damper is configured to dampen torsional oscillations of the generator. Moreover, the controller is configured to provide additional damping control to the generator.

10 Claims, 6 Drawing Sheets

Related U.S. Application Data division of application No. 14/920,993, filed on Oct. 23, 2015, now abandoned.

(51) Int. Cl.

| | |
|---|---|
| *F02C 3/04* | (2006.01) |
| *F02C 6/14* | (2006.01) |
| *F02C 7/22* | (2006.01) |
| *H02K 7/00* | (2006.01) |
| *H02K 7/18* | (2006.01) |

(52) U.S. Cl.
CPC ............ *F02C 7/22* (2013.01); *F05D 2220/32* (2013.01); *F05D 2240/35* (2013.01); *F05D 2260/96* (2013.01); *H02K 7/003* (2013.01); *H02K 7/1823* (2013.01)

(58) Field of Classification Search
CPC .......... F01D 25/04; F01D 5/026; H02P 21/05; H02P 23/26; H02P 23/04; H02K 7/1823; H02K 7/003; F03D 7/0296; F05D 2220/32; F05D 2240/35; F05D 2260/96; Y02E 10/72
See application file for complete search history.

(56) References Cited

U.S. PATENT DOCUMENTS

| | | |
|---|---|---|
| 8,217,630 B2 | 7/2012 | Markunas et al. |
| 8,350,422 B2 | 1/2013 | Bradley et al. |
| 8,415,914 B2 | 4/2013 | Baker et al. |
| 9,637,217 B2 | 5/2017 | Marrinan et al. |
| 9,821,917 B2 | 11/2017 | Becker et al. |
| 2007/0279012 A1 | 12/2007 | Sihler |
| 2009/0001940 A1 | 1/2009 | Sihler et al. |
| 2009/0009129 A1 | 1/2009 | Markhunas et al. |
| 2010/0141193 A1 | 6/2010 | Rotondo et al. |
| 2011/0115444 A1 | 5/2011 | Markunas et al. |
| 2012/0214605 A1 | 8/2012 | Snook et al. |
| 2013/0106330 A1 | 5/2013 | Schramm et al. |
| 2017/0081034 A1 | 3/2017 | Marrinan et al. |
| 2017/0346427 A1 | 11/2017 | Thet et al. |

FOREIGN PATENT DOCUMENTS

| | | |
|---|---|---|
| EP | 2325999 A2 | 5/2011 |
| EP | 2346160 A2 | 7/2011 |
| JP | H01132438 A | 5/1989 |
| JP | 2007/299399 A | 11/2007 |
| JP | 2009/071908 A | 4/2009 |
| JP | 2010/185573 A | 8/2010 |
| JP | 2010283904 A | 12/2010 |

TORSIONAL DAMPING FOR GAS TURBINE ENGINES

CROSS-REFERENCE TO RELATED APPLICATION

This application is a divisional application of U.S. patent application Ser. No. 15/491,638, filed on Apr. 19, 2017, which is a divisional application of U.S. patent application Ser. No. 14/920,993, filed on Oct. 23, 2015, the disclosures of each are incorporated by reference herein in their entireties.

FIELD OF THE INVENTION

The present application relates generally to gas turbine engines and more particularly to a torsional damper and torsional damping control to protect gas turbine engines from torsional interaction.

BACKGROUND OF THE INVENTION

A gas turbine engine generally includes, in serial flow order, a compressor section, a combustion section, a turbine section, and an exhaust section. In operation, air enters an inlet of the compressor section where one or more axial compressors progressively compress the air until it reaches the combustion section. Fuel is mixed with the compressed air and burned within the combustion section to provide combustion gases. The combustion gases are routed from the combustion section through a hot gas path defined within the turbine section and then exhausted from the turbine section via the exhaust section.

In particular configurations, the turbine section includes, in serial flow order, a high pressure (HP) turbine and a low pressure (LP) turbine. The HP turbine and the LP turbine each include various rotatable turbine components such as turbine rotor blades, rotor disks and retainers, and various stationary turbine components such as stator vanes or nozzles, turbine shrouds and engine frames. The rotatable and the stationary turbine components at least partially define the hot gas path through the turbine section. As the combustion gases flow through the hot gas path, thermal energy is transferred from the combustion gases to the rotatable turbine components and the stationary turbine components.

Gas turbine engines and other types of turbo-machinery are often used to drive loads such as electrical generators. Gas turbine engines and other large drive train systems have a moment of inertia, a torsional stiffness, and natural damping. The low mechanical damping in high power trains can cause torsional interaction between power system components and the mechanical drive train. For example, if one of the natural frequencies of the mechanical drive train is excited to a torsional resonance, the resulting alternating mechanical torque can reach values that can damage or cause fatigue in components of the rotor shaft system.

Thus, a system and method of operating a gas turbine engine or similar machinery so as to provide improved torsional damping would be welcomed in the art.

BRIEF DESCRIPTION OF THE INVENTION

Aspects and advantages of the invention will be set forth in part in the following description, or may be obvious from the description, or may be learned through practice of the invention.

In accordance with one aspect of the present disclosure, a gas turbine engine assembly is disclosed. The gas turbine engine assembly includes a compressor configured to increase pressure of incoming air, a combustion chamber, at least one turbine (e.g. high- and low-pressure turbines) coupled to a generator, a torsional damper, and a controller. The combustion chamber is configured to receive a pressurized air stream from the compressor. Further, fuel is injected into the pressurized air in the combustion chamber and ignited so as to raise a temperature and energy level of the pressurized air. The turbine is operatively coupled to the combustion chamber so as to receive combustion products that flow from the combustion chamber. The generator is coupled to a shaft system of the turbine (e.g. any one of or combination of a high pressure shaft system, a low pressure shaft system, or an intermediate shaft system) via a shaft. Thus, the torsional damper is configured to dampen torsional oscillations on the shaft system of the generator, e.g. caused by negative damping and/or forced excitations. Moreover, the controller is configured to provide additional damping control to the generator.

In one embodiment, the torsional damper may include at least one of a mechanical damper or an electrical damper. For example, in particular embodiments, the mechanical damper may include a viscous damper. More specifically, the viscous damper may be positioned circumferentially around the shaft of the generator.

In certain embodiments, the gas turbine engine assembly may also include a power converter having one or more electrical circuits. Thus, in such embodiments, the electrical damper may include a resistor integrated into one of the electrical circuits of the power converter. In addition, in certain embodiments, the controller may be configured to control the resistor so as to prohibit the generator from having a constant power load at frequencies of torsional interaction.

In another embodiment, the gas turbine engine assembly may include a power bus damper configured to prohibit the generator from having a constant power load at frequencies of torsional interaction. More specifically, in certain embodiments, the power bus damper may include at least one of an active load, a controlled resistive load, an energy storage device, or similar.

In further embodiments, the controller may be configured to control a power factor of the generator so as to provide torsional damping of the generator by decreasing the power factor and creating losses internal to windings of the generator.

In additional embodiments, the torsional damper may be configured to reduce the oscillating torque between the generator and the turbine.

In another aspect, the present disclosure is directed to an electrical power system. The electrical power system includes a first inertia system connected to a second inertia system via a shaft. Further, the first inertia system is larger than the second inertia system. In addition, the second inertia system may include a negative ratio of delta torque and delta speed. Thus, the electrical power system also includes a torsional damper configured to dampen torsional oscillations between the first and second inertia systems, e.g. caused by negative damping and/or forced excitations.

In yet another aspect, the present disclosure is directed to a method of operating a gas turbine engine assembly. The method includes pressurizing air via a compressor of the assembly. The method also includes providing the pressurized air from the compressor to a combustion chamber. Still another step includes injecting fuel into the pressurized air within the combustion chamber and igniting the fuel so as to raise a temperature and energy level of the pressurized air. The method further includes providing combustion products from the combustion chamber to a turbine coupled to a generator of the assembly. In addition, the method includes damping torsional oscillations of a shaft system of the generator via a torsional damper and additional damping provided by a generator controller.

In one embodiment, the step of damping torsional oscillations of the shaft system of the generator via the torsional damper may further include providing at least one of a mechanical damper or an electrical damper. More specifically, in certain embodiments, the step of damping torsional oscillations of the shaft system of the generator may include positioning the mechanical damper circumferentially around the shaft.

In another embodiment, the method may include integrating the electrical damper into a power converter of the generator. More specifically, in such an embodiment, the electrical damper may include a resistor. For example, in certain embodiments, the method may include controlling, via the controller, the resistor so as to prohibit the generator from having a constant power load at frequencies of torsional interaction.

In additional embodiments, the method may include operatively coupling a power bus damper with the power converter and controlling the power bus damper so as to prohibit the generator from having a constant power load. More specifically, in such embodiments, the power bus damper may include at least one of an active load, a controlled resistive load, an energy storage device, or similar.

In yet another embodiment, the method may include controlling a power factor of the generator so as to provide torsional damping of the generator by decreasing the power factor and creating losses internal to windings of the generator.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
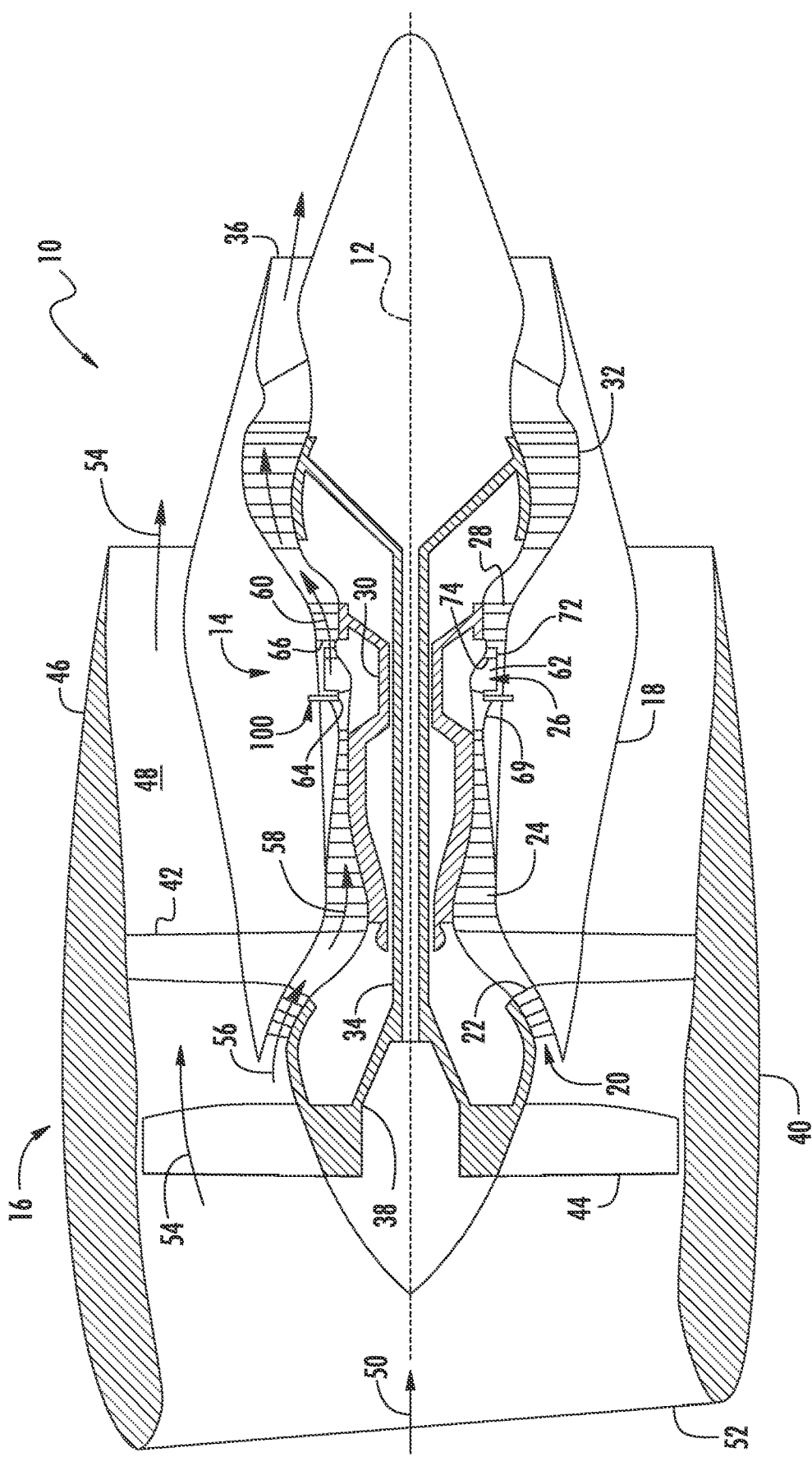
FIG. 1 illustrates a schematic cross-sectional view of a gas turbine engine according to the present disclosure.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components. The terms "upstream" and "downstream" refer to the relative flow direction with respect to fluid flow in a fluid pathway. For example, "upstream" refers to the flow direction from which the fluid flows, and "downstream" refers to the flow direction to which the fluid flows.

Further, as used herein, the terms "axial" or "axially" refer to a dimension along a longitudinal axis of an engine. The term "forward" used in conjunction with "axial" or "axially" refers to a direction toward the engine inlet, or a component being relatively closer to the engine inlet as compared to another component. The term "rear" used in conjunction with "axial" or "axially" refers to a direction toward the engine nozzle, or a component being relatively closer to the engine nozzle as compared to another component. The terms "radial" or "radially" refer to a dimension extending between a center longitudinal axis of the engine and an outer engine circumference.

Generally, the present disclosure is directed to a gas turbine engine assembly having improved torsional damping. The gas turbine engine assembly generally includes a compressor, a combustion chamber, at least one turbine (e.g. a high- and low-pressure turbine) coupled to a generator, a torsional damper, and a controller configured to provide additional damping. As is generally understood, the combustion chamber is configured to receive pressurized air from the compressor, wherein fuel is injected into the pressurized air and ignited so as to raise a temperature and energy level of the pressurized air. The turbine is operatively coupled to the combustion chamber so as to receive combustion products that flow from the combustion chamber. The generator is coupled to a shaft system of the turbine via a shaft. Thus, the torsional damper (i.e. mechanical, electrical, and/or both) is configured to dampen torsional oscillations of the shaft system of the generator. In addition, the controller is configured to provide additional damping control to the generator.

Thus, the present disclosure provides many advantages not present in the prior art. For example, the present disclosure provides a stable mechanical drive of a generator or motor for an aircraft power system as well as any other suitable electrical power system by reducing oscillating torque between the generator to the turbine (i.e. caused by negative damping and/or forced excitations). In addition, the system provides simpler analysis of the power system loads. Further, the torsional damping of the present disclosure is configured to smooth the transmission of torque to the turbine, thereby allowing overall turbine design requirements to be relaxed. Thus, the size, cost, and/or weight of the turbine thus may be reduced. Moreover, the gas turbine engine may be more reliable with longer component lifetime. In addition, the torsional damping features of the present disclosure may be original equipment or part of a retrofit.

Referring now to the drawings in detail, wherein identical numerals indicate the same elements throughout the figures, FIG. 1 illustrates an exemplary gas turbine engine 10 (high bypass type) according to one embodiment of the present disclosure. As shown, the illustrated gas turbine engine 10 has an axial longitudinal centerline axis 12 therethrough for reference purposes. Further, the gas turbine engine 10 preferably includes a core gas turbine engine generally identified by numeral 14 and a fan section 16 positioned upstream thereof. The core engine 14 typically includes a generally tubular outer casing 18 that defines an annular inlet 20. The outer casing 18 further encloses and supports a booster 22 for raising the pressure of the air that enters core engine 14 to a first pressure level. A high pressure, multi-stage, axial-flow compressor 24 receives pressurized air from the booster 22 and further increases the pressure of the air. The pressurized air flows to a combustor 26, where fuel is injected into the pressurized air stream and ignited to raise the temperature and energy level of the pressurized air. The high energy combustion products flow from the combustor 26 to a first (high pressure) turbine 28 for driving the high pressure compressor 24 through a first (high pressure) drive shaft 30, and then to a second (low pressure) turbine 32 for driving the booster 22 and the fan section 16 through a second (low pressure) drive shaft 34 that is coaxial with the first drive shaft 30. After driving each of the turbines 28 and 32, the combustion products leave the core engine 14 through an exhaust nozzle 36 to provide at least a portion of the jet propulsive thrust of the engine 10.

The fan section 16 includes a rotatable, axial-flow fan rotor 38 that is surrounded by an annular fan casing 40. It will be appreciated that fan casing 40 is supported from the core engine 14 by a plurality of substantially radially-extending, circumferentially-spaced outlet guide vanes 42. In this way, the fan casing 40 encloses the fan rotor 38 and the fan rotor blades 44. The downstream section 46 of the fan casing 40 extends over an outer portion of the core engine 14 to define a secondary, or bypass, airflow conduit 48 that provides additional jet propulsive thrust.

From a flow standpoint, it will be appreciated that an initial airflow, represented by arrow 50, enters the gas turbine engine 10 through an inlet 52 to the fan casing 40. The airflow passes through the fan blades 44 and splits into a first air flow (represented by arrow 54) that moves through the conduit 48 and a second air flow (represented by arrow 56) which enters the booster 22.

The pressure of the second airflow 56 is increased and enters the high pressure compressor 24, as represented by arrow 58. After mixing with fuel and being combusted in the combustor 26, the combustion products 60 exit the combustor 26 and flow through the first turbine 28. The combustion products 60 then flow through the second turbine 32 and exit the exhaust nozzle 36 to provide at least a portion of the thrust for the gas turbine engine 10.

Still referring to FIG. 1, the combustor 26 includes an annular combustion chamber 62 that is coaxial with longitudinal centerline axis 12, as well as an inlet 64 and an outlet 66. As noted above, the combustor 26 receives an annular stream of pressurized air from a high pressure compressor discharge outlet 69. A portion of this compressor discharge air ("CDP" air) flows into a mixer (not shown). Fuel is injected from a fuel nozzle 100 to mix with the air and form a fuel-air mixture that is provided to the combustion chamber 62 for combustion. Ignition of the fuel-air mixture is accomplished by a suitable igniter, and the resulting combustion gases 60 flow in an axial direction toward and into an annular, first stage turbine nozzle 72. The nozzle 72 is defined by an annular flow channel that includes a plurality of radially-extending, circumferentially-spaced nozzle vanes 74 that turn the gases so that they flow angularly and impinge upon the first stage turbine blades of the first turbine 28. As shown in FIG. 1, the first turbine 28 preferably rotates the high-pressure compressor 24 via the first drive shaft 30. The low-pressure turbine 32 preferably drives the booster 24 and the fan rotor 38 via the second drive shaft 34.

The combustion chamber 62 is housed within engine outer casing 18. Fuel is supplied into the combustion chamber by one or more fuel nozzles. Liquid fuel is transported through conduits or passageways within a stem of each fuel nozzle. Further, the gas turbine engine 10 may use natural gas, various types of syngas, and/or other types of fuels. Moreover, the gas turbine engine 10 may have different configurations and may use other types of components in addition to those components shown. Multiple gas turbine engines, other types of turbines, and other types of power generation equipment also may be used herein together.

Figure 2:
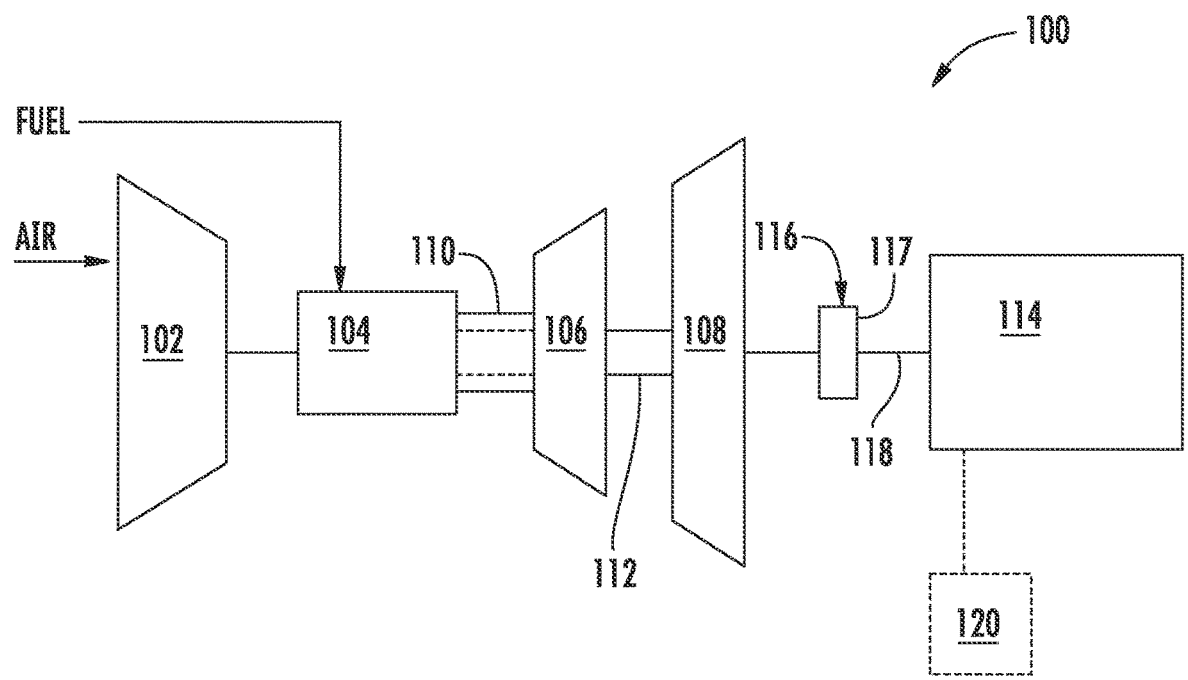
FIG. 2 illustrates a block diagram of one embodiment of a gas turbine engine assembly according to the present disclosure.
Figure 3:
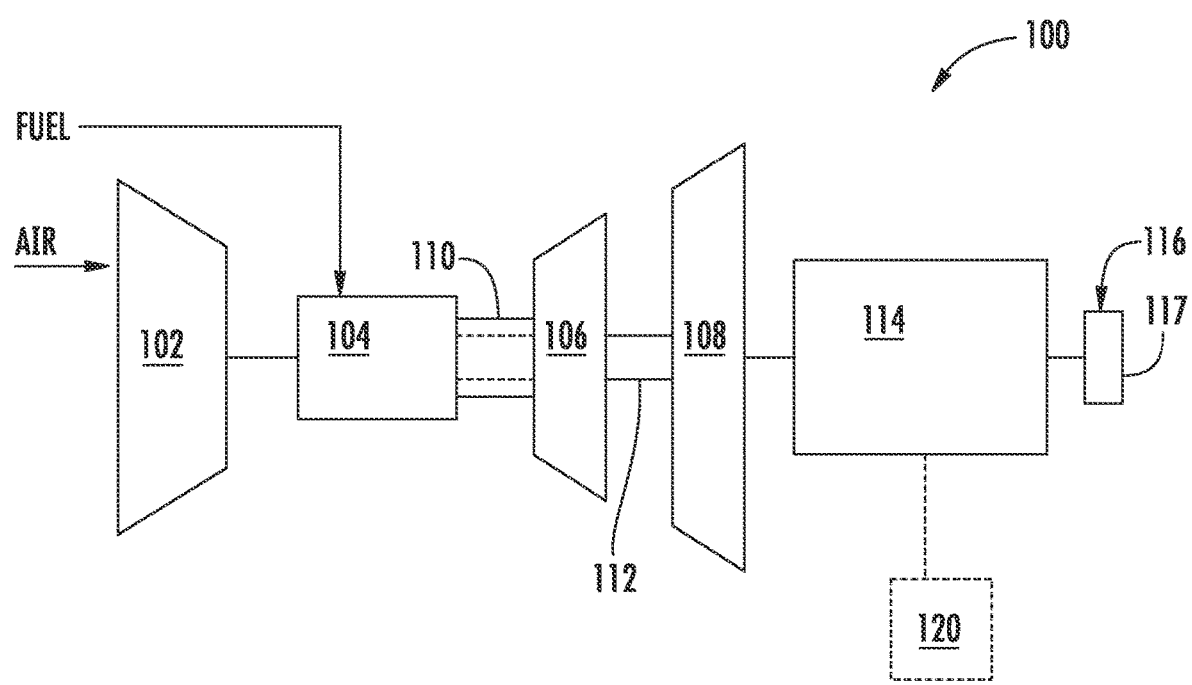
FIG. 3 illustrates a block diagram of another embodiment of a gas turbine engine assembly according to the present disclosure.
Figure 4:
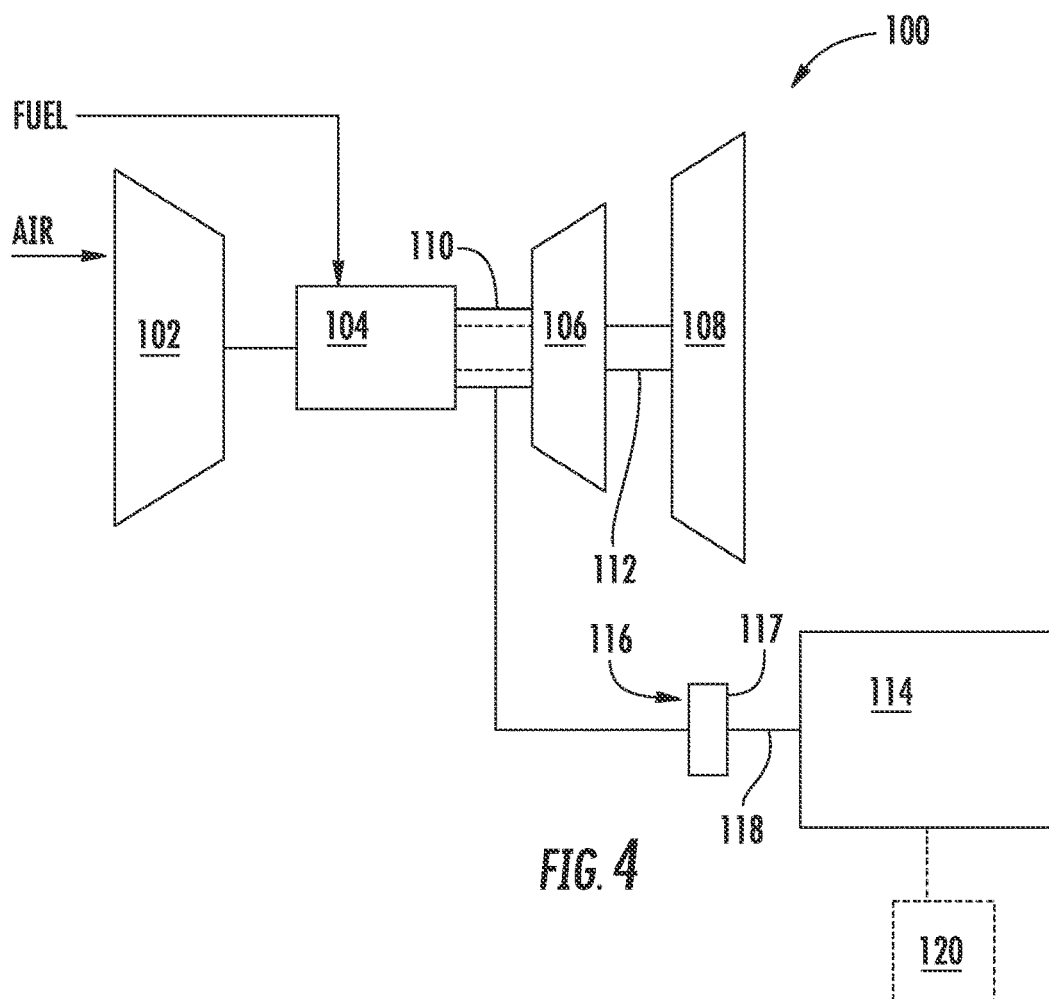
FIG. 4 illustrates a block diagram of yet another embodiment of a gas turbine engine assembly according to the present disclosure.
Figure 5:
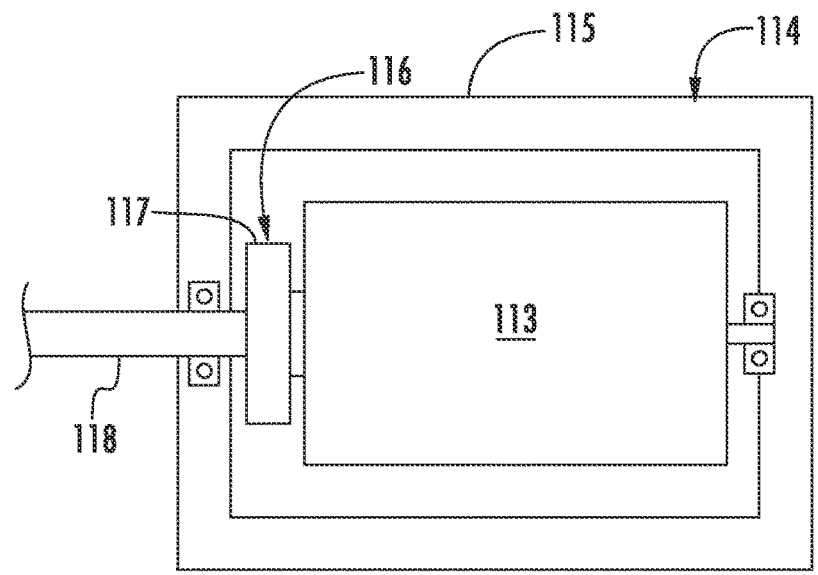
FIG. 5 illustrates a block diagram of one embodiment of a generator of a gas turbine engine assembly according to the present disclosure.

Referring now to FIGS. 2-4, various simplified, schematic views of a gas turbine engine assembly 100 according to the present disclosure is illustrated. As shown in the illustrated embodiments, the gas turbine engine assembly 100 generally includes a compressor 102, a combustion chamber 104, a high-pressure turbine 106 and a high-pressure shaft 110, a low-pressure turbine 108 and a low-pressure shaft 112, and various other optional components. For example, the gas turbine engine assembly 100 may also include a generator 114 or a similar type of load. The generator 114 may be any type of device for the generation of electrical power. More specifically, as shown in FIG. 5, the generator 114 may include a generator rotor 113 that rotates within a generator stator 115. More specifically, rotation of the rotor 113 is due to the interaction 13 between the windings and/or magnetic fields of the generator 114 which produces a torque around the rotor's axis. Further, the generator 114 may be driven by the turbines 106, 108 via the shafts 110, 112. Other components and other configurations may also be used according to the present disclosure.

Figure 6:
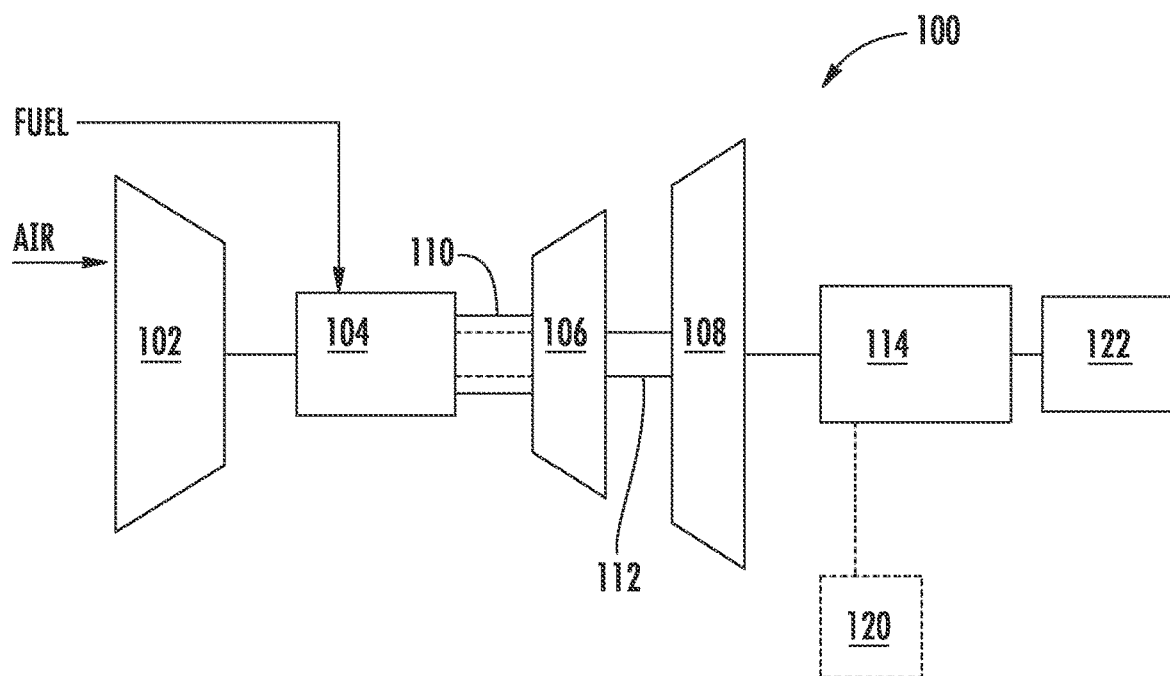
FIG. 6 illustrates a block diagram of another embodiment of a gas turbine engine assembly according to the present disclosure.
Figure 7:
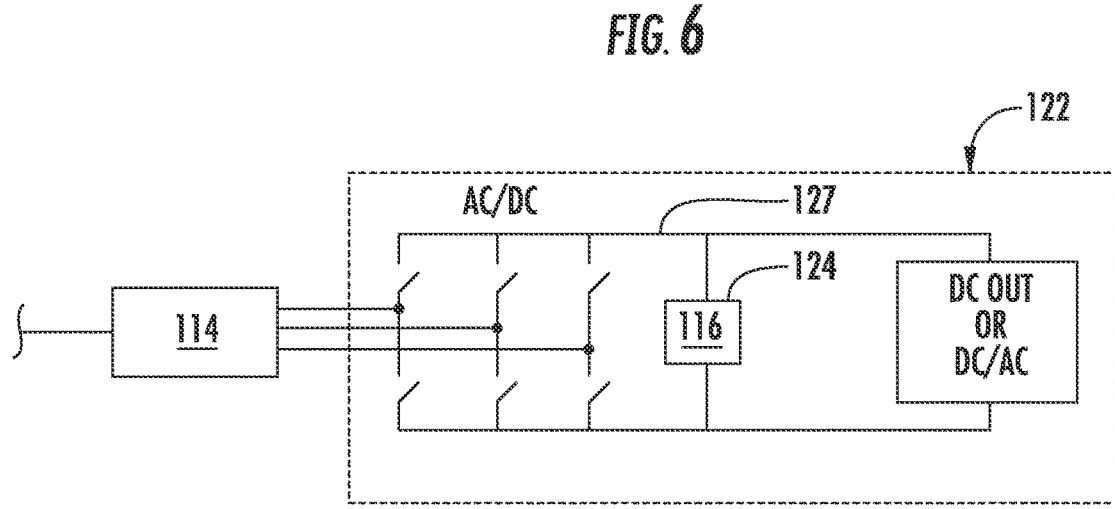
FIG. 7 illustrates a partial block diagram of one embodiment of a generator and a power converter of a gas turbine engine assembly according to the present disclosure.

In addition, as shown in FIGS. 6 and 7, the gas turbine engine assembly 100 may also include a power converter 122 having one or electrical circuits 127. The power converter 122 may include any suitable power converter. For example, the power converter 122 generally includes circuitry for converting a variable frequency AC voltage from the generator 114 into a voltage that is supplied to power grid (not shown). Specifically, the power converter 122 is selectively activated to produce an output voltage, which is the AC voltage supplied to power grid. Thus, the power converter 122 may include various power switching devices such as, for example, insulated gate bipolar transistors (IGBTs), integrated gate-commutated thyristors (IGCTs), or any other suitable switching devices.

Referring now to FIGS. 2-9, the gas turbine engine assembly 100 also may include a torsional damper 116 configured to dampen torsional oscillations of the generator 114 and/or a controller 120 configured to provide additional damping control to the engine 10. Thus, in certain embodiments, the torsional damper 116 is configured to reduce the oscillating torque between the generator 114 and the turbine 106, 108.

More specifically, as shown in the illustrated embodiment of FIGS. 2-5, the torsional damper 116 may be a mechanical damper 117. In addition, as shown, the mechanical damper 117 may be positioned circumferentially around the shaft 118, which operatively couples the low-pressure turbine 108 to the generator 114. Further, as shown in FIG. 2, the mechanical damper 117 may be configured at the front end of the generator 114. Alternatively, as shown in FIG. 3, the mechanical damper 117 may be configured at the rear end of the generator 114. In addition, the mechanical damper 117 may be separate from the generator 114 (FIG. 2) or integral with the generator 114 (FIG. 5). Further, as shown in FIG. 2, the torsional damper 116 and the generator 114 may be mechanically connected to the low-pressure shaft system (i.e. the fan, booster, and/or low-pressure turbine 108). Alternatively, as shown in FIG. 4, the torsional damper 116 and the generator 114 may be mechanically connected to the high-pressure shaft system (i.e. the compressor 102 and/or the high-pressure turbine 106). In still additional embodiments, the torsional damper 116 may be connected to any other shaft system.

It should be understood that the mechanical damper 117 may be any suitable mechanical damper now known or later developed in the art. For example, in one embodiment, the mechanical damper 117 may include a viscous damper. As used herein, a viscous damper generally refers to a mechanical device, which resists motion via viscous friction. The resulting force is substantially proportional to the oscillating velocity, but acts in the opposite direction, thereby decreasing the oscillation and absorbing energy without resulting in steady state losses.

Figure 8:
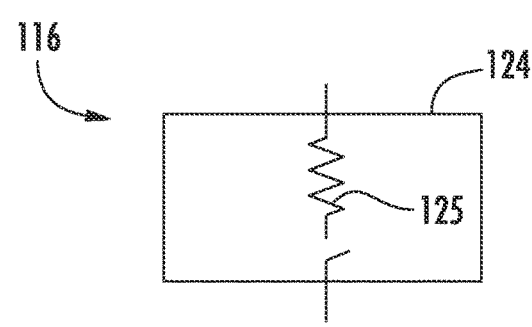
FIG. 8 illustrates a block diagram of one embodiment of an electrical damper of a gas turbine engine assembly according to the present disclosure.

It should also be understood that, in addition to or in placement of the mechanical damper 117, additional damping means may be used in the engine 10. For example, as shown in FIGS. 6-8, the torsional damper 116 may include an electrical damper 124. More specifically, as shown, the electrical damper 124 may be integrated into the power converter 122 of the assembly 100. In certain embodiments, as shown in FIGS. 7 and 8, the electrical damper 124 may include one or more resistors 125 integrated into one of the electrical circuits 127 of the power converter 122. Thus, in such an embodiment, the controller 120 may also be configured to control the resistor 125 so as to prohibit the generator 114 from having a constant power load, thereby providing torsional damping thereof. Accordingly, the electrical damper 124 is configured to provide damping for forced excitations introduced to the assembly 100.

Figure 9:
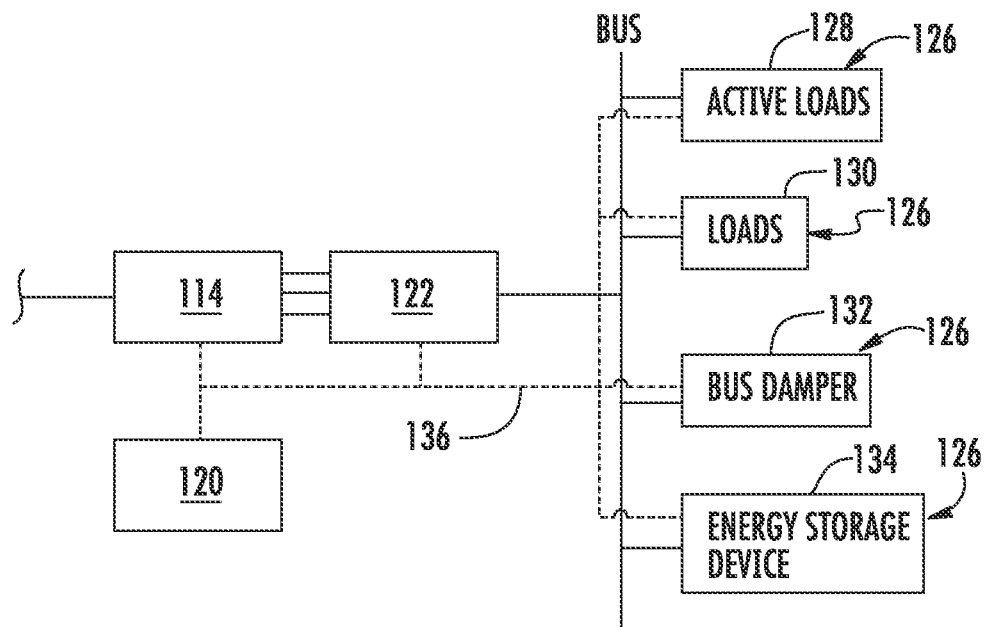
FIG. 9 illustrates a partial block diagram of another embodiment of a gas turbine engine assembly according to the present disclosure, particularly illustrating various embodiments of a power bus damper.

In another embodiment, as shown in FIG. 9, the gas turbine engine assembly 100 may include a power bus damper component 126 configured to prohibit the generator 114 from having a constant power load. More specifically, as shown, the power bus damper component 126 may include at least one of an active load 128, a controlled resistive load 130, a bus damper 132, or an energy storage device 134 (e.g. a battery, capacitor, or similar). Further, as shown, the power bus damper component(s) 126 is configured to receive a speed and/or torque signal 136 from the generator 114 or the controller 120. Based on the signal 136, the bus damper component 126 is configured to prevent the bus from having a constant power load separated from voltage control. Further, for generators having a power converter (as shown), the power factor can be reduced to increase generator losses at the required mechanical damping frequencies. Such operation does not result in steady state losses, but rather only losses required to damp torsional oscillations.

In further embodiments, the controller 120 is configured to control a power factor of the generator 114 so as to provide torsional damping of the generator 114, e.g. by decreasing the power factor and creating losses internal to windings of the generator 114 and connecting cables.

Figure 10:
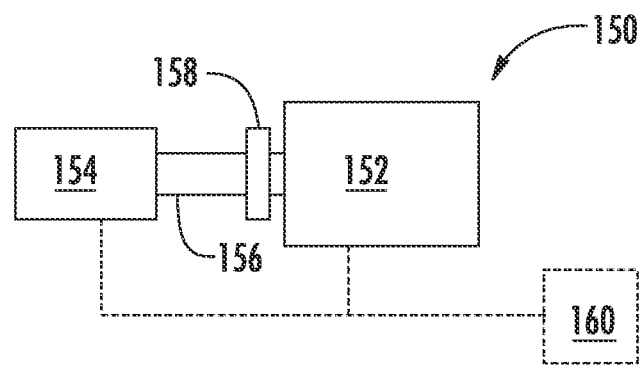
FIG. 10 illustrates a block diagram of one embodiment of an electrical power system according to the present disclosure.

Referring now to FIG. 10, it should be understood that the advantages described above may also be suitable for additional power systems, in addition to the gas turbine engine 10 of an aircraft power system as described herein. For example, additional electrical power systems that may utilize the torsional damping features of the present disclosure may include gas turbine engines, wind turbines, steam turbines, or any other suitable generator-driven system. For example, as shown in FIG. 10, a schematic diagram of an electrical power system 150 having improved torsional damping according to the present disclosure is illustrated. More specifically, as shown, the electrical power system 150 includes a first inertia system 152 connected to a second inertia system 154 via a shaft 156. Further, as shown, the first inertia system 152 is larger than the second inertia system 154. For example, in certain embodiments, the first inertia system 152 may be a generator, whereas the second inertia system 154 may include a generator driver, including but not limited to a low-pressure shaft system, a high-pressure shaft system, an intermediate shaft system, one or more rotor blades (optionally coupled to a gearbox), or any other suitable generator-driving component.

Thus, the electrical power system 150 may include a torsional damper 158 configured to dampen torsional oscillations between the first and second inertia systems 152, 154. In such systems, the second inertia system 154 may have a negative ratio of delta torque and delta speed, i.e. may have negative damping. Thus, the torsional damper 158 may be configured to correct the negative damping of the second inertia system 154. Alternatively, the torsional damper 158 may be configured to provide damping for forced excitations introduced to the systems 152, 154.

Figure 11:
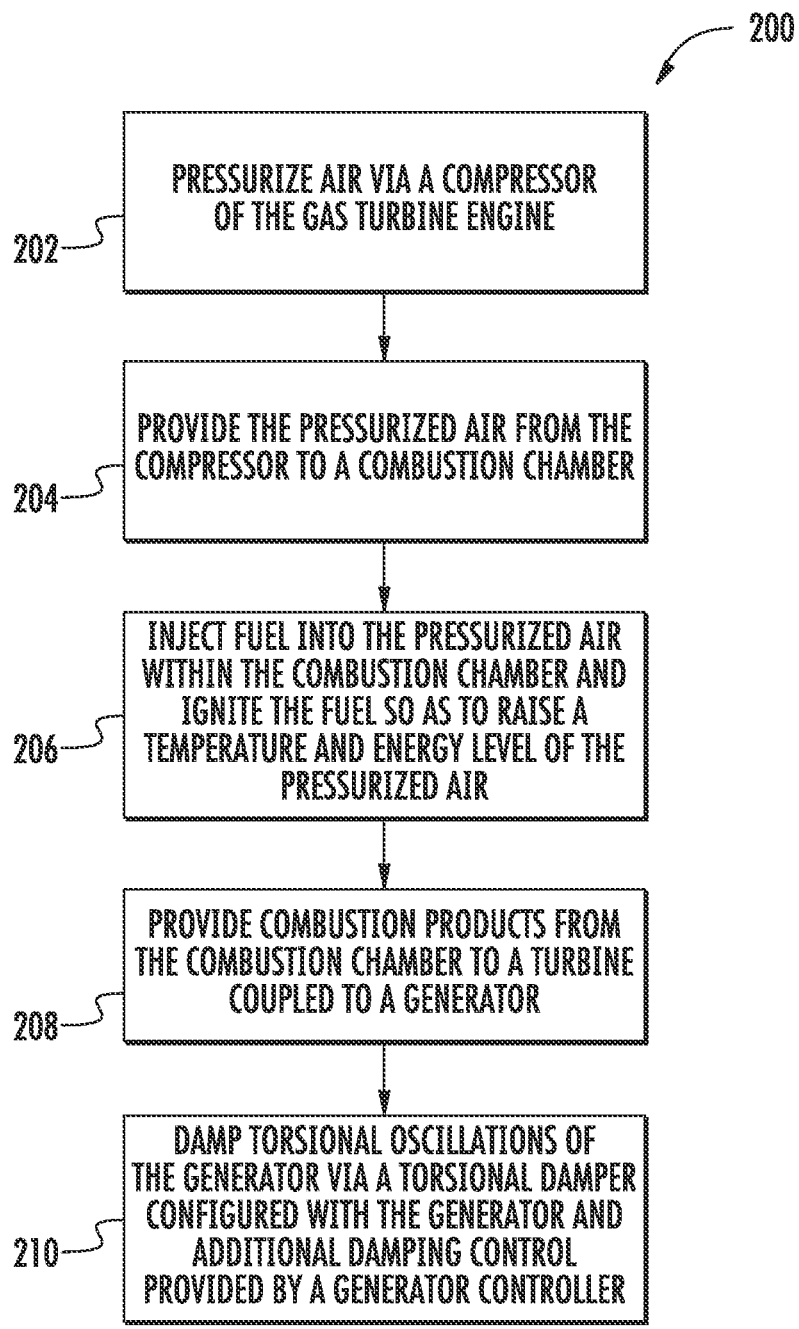
FIG. 11 illustrates a flow diagram of one embodiment of a method of operating a gas turbine engine assembly according to the present disclosure.

In additional embodiments, the electrical power system 150 includes a controller 160 configured to provide additional damping control for the first and second inertia systems 152, 154. Referring now to FIG. 11, a flow diagram of one embodiment of a method 200 of operating a gas turbine engine. As shown at 202, the method 200 includes pressurizing air via a compressor 24 of the gas turbine engine 10. As shown at 204, the method 200 includes providing the pressurized air to a combustion chamber 62 from the compressor 24. As shown at 206, the method 200 includes injecting fuel into pressurized air within the combustion chamber 62 and igniting the fuel so as to raise a temperature and energy level of the pressurized air. As shown at 208, the method 200 includes providing combustion products from the combustion chamber 62 to the turbine (e.g. turbines 106, 108) coupled to a generator 114. As shown at 210, the method 200 also includes damping torsional oscillations of the generator 114 via a torsional damper 116 and additional damping provided by a generator controller 120.

In one embodiment, the step of damping torsional oscillations of the generator 114 via the torsional damper 116 may further include providing at least one of a mechanical damper 117 or an electrical damper 124. More specifically, in certain embodiments, the step of damping torsional oscillations of the generator 114 via the torsional damper 116 may include positioning the mechanical damper 117 circumferentially around the shaft 118 (FIG. 2).

In another embodiment, as shown in FIG. 7, the method 200 may include integrating the electrical damper 124 into the power converter 122. More specifically, as mentioned, the electrical damper 124 may include a resistor 125. Thus, in such embodiments, the method 200 may include controlling, via the controller 120, the resistor 125 so as to prohibit the generator 114 from having a constant power load at frequencies of torsional interaction.

In additional embodiments, the method 200 may include operatively coupling a power bus damper 126 with the power converter 122 and/or the controller 120. Thus, the power bus damper 126 is configured to prohibit the generator 114 from having a constant power load. More specifically, as described herein, the power bus damper 126 may include an active load 128, a controlled resistive load 130, a bus damper 132, an energy storage device 134, or similar, or combinations thereof.

In yet another embodiment, the method 200 may include controlling a power factor of the generator 114 so as to provide torsional damping of the generator 114, e.g. by decreasing the power factor and creating losses internal to windings of the generator 114 or connecting cables.

It should also be understood that although the use of the gas turbine engine assembly 100 has been described herein, the torsional damper 160 may be used with any type of turbo-machinery and the like. Thus, the combination of any or all of the damping components and/or features described herein can be used to provide positive generator damping, e.g. at specific frequencies, wide frequency ranges, and may be adjustable.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method of operating a gas turbine engine assembly, comprising:
   pressurizing air via a compressor of the gas turbine engine assembly;
   providing the pressurized air from the compressor to a combustion chamber;
   injecting fuel into the pressurized air within the combustion chamber and igniting the fuel so as to raise a temperature and energy level of the pressurized air;
   providing combustion products from the combustion chamber to a turbine coupled to a generator; and
   damping torsional oscillations of a shaft system of the generator via a controller providing a speed signal or a torque signal to at least one of a battery and a load in parallel to prohibit the generator from having a constant power load at frequencies of torsional interaction.

2. The method of claim 1, wherein each of the battery and the load are configured to prevent a power bus from having a constant power load in response to the speed signal or the torque signal.

3. The method of claim 1, wherein the controller controls a power bus damper to prohibit the generator from having a constant power load at frequencies of torsional interaction.

4. The method of claim 3, wherein the load comprises at least one of an active load or a controlled resistive load.

5. The method of claim 4, wherein the power bus damper comprises at least one of the active load, the controlled resistive load, or an energy storage device.

6. The method of claim 1, further comprising:
   converting, via a power converter operably coupled with the controller, AC voltage into DC voltage, wherein the power converter is configured to dampen torsional oscillations by reducing a power factor to increase generator losses at mechanical damping frequencies.

7. A method of operating a gas turbine engine assembly, comprising:
   providing combustion products from a combustion chamber to a turbine coupled to a generator; and
   damping torsional oscillations of a shaft system of the generator via a power bus damper operably coupled with the shaft system of the generator through a power bus and configured to prohibit the generator from having a constant power load at frequencies of torsional interaction, wherein the power bus damper includes a battery and an active load in parallel.

8. The method of claim 7, further comprising:
   providing a speed signal or a torque signal to the power bus damper, wherein each of the battery and the active load are configured to prevent the power bus from having a constant power load in response to the speed signal or the torque signal.

9. The method of claim 8, further comprising converting, via a power converter, AC voltage into DC voltage, wherein the power converter is configured to dampen torsional oscillations by reducing a power factor to increase generator losses at mechanical damping frequencies.

10. The method of claim 7, wherein the power bus damper further controls a controlled resistive load of a resistor to prohibit the generator from having a constant power load at frequencies of torsional interaction.

* * * * *